United States Patent [19]

Kayser et al.

[11] Patent Number: 4,523,420
[45] Date of Patent: Jun. 18, 1985

[54] X-RAY EXAMINATION APPARATUS HAVING AT LEAST ONE FILM STORAGE MAGAZINE

[75] Inventors: Harald Kayser, Wedel; Wilfried Pfeiffer, Quickborn, both of Fed. Rep. of Germany

[73] Assignee: U.S. Philips Corporation, New York, N.Y.

[21] Appl. No.: 644,151

[22] Filed: Aug. 24, 1984

Related U.S. Application Data

[63] Continuation of Ser. No. 387,994, Jun. 14, 1982, abandoned.

[30] Foreign Application Priority Data

Jun. 27, 1981 [DE] Fed. Rep. of Germany ....... 3125397

[51] Int. Cl.³ ............................................. G03B 41/16
[52] U.S. Cl. .................................. 53/266 R; 414/403;
378/172; 378/173; 271/9; 271/902
[58] Field of Search .................... 414/403, 411, 416;
378/172, 173; 271/3, 9, 163, 164, 288, 302,
DIG. 9; 53/266 R, 266 C

[56] References Cited

U.S. PATENT DOCUMENTS

| | | | |
|---|---|---|---|
| 3,888,587 | 6/1975 | Perl | 414/411 X |
| 3,891,850 | 6/1975 | Bridgeman | 378/173 |
| 3,891,854 | 6/1975 | Hura | 414/411 |
| 3,991,317 | 11/1976 | Kunne et al. | 378/173 |
| 4,031,400 | 6/1977 | Hunt et al. | 378/173 |
| 4,179,112 | 12/1979 | Breuers et al. | 271/3 |
| 4,234,795 | 11/1980 | Müller | 414/411 X |
| 4,282,439 | 8/1981 | Matsuura | 378/173 |

FOREIGN PATENT DOCUMENTS

| | | |
|---|---|---|
| 2125674 | 7/1972 | Fed. Rep. of Germany . |
| 2616926 | 10/1977 | Fed. Rep. of Germany . |
| 1367443 | 9/1974 | United Kingdom . |
| 1420918 | 1/1976 | United Kingdom . |
| 1454750 | 11/1976 | United Kingdom . |
| 2096354 | 10/1982 | United Kingdom . |

Primary Examiner—Joseph E. Valenza
Assistant Examiner—David A. Bucci
Attorney, Agent, or Firm—Marc D. Schechter

[57] ABSTRACT

The invention relates to an X-ray examination apparatus comprising a light-tight film processing section with one or more film storage magazines. A film sheet can be removed from the magazine in order to be transported to the exposure position. The apparatus also comprises a cassette loading and unloading station as well as a film guide device. A film sheet can be transported by the film guide device either into the beam path at the exposure position or into a cassette in the cassette loading and unloading station. Thus, cassette exposures can also be made without loading and unloading the cassette in a separate dark room or without a so-called daylight system being necessary.

8 Claims, 3 Drawing Figures

X-RAY EXAMINATION APPARATUS HAVING AT LEAST ONE FILM STORAGE MAGAZINE

This is a continuation of application Ser. No. 387,994, filed June 14, 1982, now abandoned.

BACKGROUND OF THE INVENTION

The invention relates to an X-ray examination apparatus comprising a light-tight film processing section with at least one film storage magazine for storing a number of film sheets. One film sheet at a time can be removed from the storage magazine in order to be transported to an exposure position by means of an unloading and transport device.

An X-ray examination apparatus of this kind is known from U.S. Pat. No. 3,891,850 and German Offenlegungsschrift No. 2616926. For an X-ray exposure, a film is automatically removed from the film storage magazine in order to be transported to an exposure position. After the exposure, the film is transported to a takeup magazine of the examination apparatus or to a development device which is coupled to the examination apparatus.

The advantages of such an X-ray examination apparatus over a conventional X-ray examination apparatus (especially in the case of Bucky exposures) are that the operator need not insert a new film cassette with a film sheet for each exposure, so that loading and unloading of the cassette in a dark room are no longer necessary and the amount of work is substantially reduced. When a development device is integrated in the X-ray examination apparatus (a standard feature of many contemporary devices), a dark room is substantially superfluous.

However, even though such an apparatus is usually used for Bucky exposures, quite often cassette exposures are desirable. For example, for making exposures of extremities (hands or feet), a cassette is placed on the table top of the X-ray examination apparatus and the hand to be radiographed is positioned on the cassette. If the film for such cassette exposures would have to be inserted into the cassette in a dark room and be removed therefrom again in a dark room, the advantages of such an apparatus would be substantially lost.

Therefore, devices are known in which the cassettes are inserted in order to be automatically loaded and unloaded (see, for example United Kingdom Pat. No. 1,420,918, FIGS. 5 and 6, and United Kingdom Pat. No. 1,454,750, FIGS. 7 and 8). Such devices, which are referred to as "daylight systems", are comparatively expensive. Usually each film or cassette format requires a daylight system.

SUMMARY OF THE INVENTION

It is an object of the invention to enable loading and unloading of X-ray films without a separate daylight system or dark room being required.

In an X-ray examination apparatus of the kind described above, this object is achieved in that the film processing section comprises a cassette loading and unloading station. The cassette loading and unloading station serves to accomodate a cassette which can be introduced from the outside and which is to be automatically opened and closed. Between the film storage magazine or magazines on the one side and the exposure station or the cassette loading and unloading station on the other side, there is arranged a film guide device. The film guide device can be switched over so that the film transport takes place either to or form the exposure position, to or from the cassette loading and unloading station.

The invention utilizes the fact that an X-ray examination apparatus of the kind described above already incorporates essential functions which characterize a daylight loading and unloading device. Films are removed from a magazine, are transported to a first position and are subsequently returned from this position to a takeup magazine or a development device. Therefore, such an X-ray examination apparatus only requires an entrance (cassette loading and unloading station) in which the cassette can be introduced in a light-tight manner and in which it can be automatically opened and closed, as well as a film guide device which enables the transport of film sheets either to the exposure position and back or to the cassette loading and unloading station.

DESCRIPTION OF THE PREFERRED EMBODIMENTS

Figure 1:
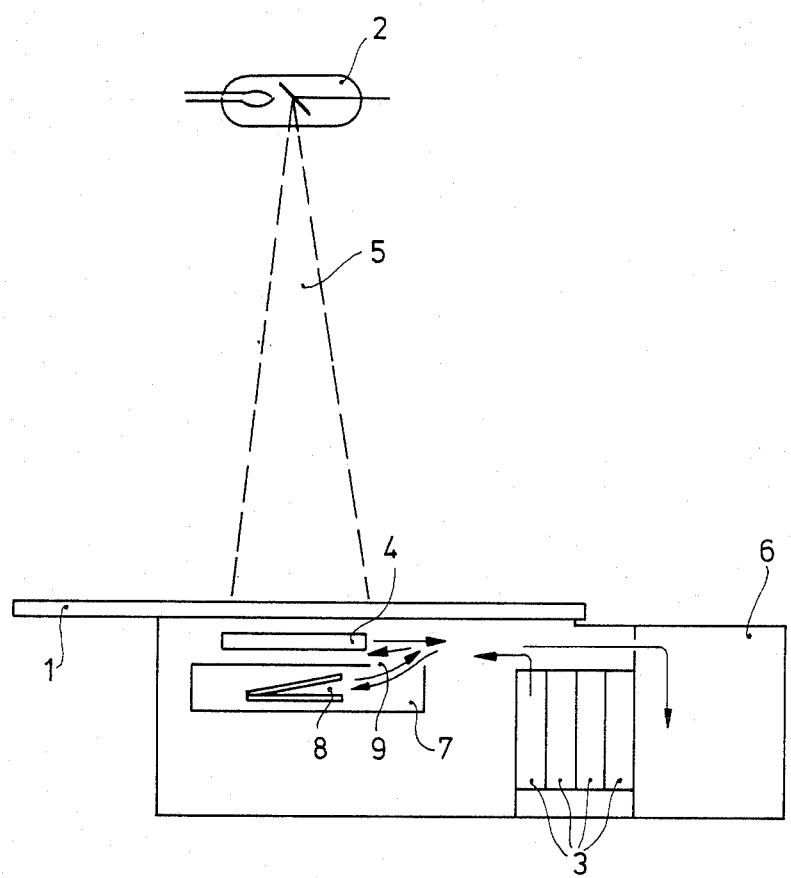
FIG. 1 is a schematic side elevational view of an X-ray examination apparatus according to the invention.

FIG. 1 shows an X-ray examination apparatus according to the invention for making Bucky exposures. The X-ray examination apparatus comprises a patient table 1 which is horizontally arranged. Over the table there is arranged the X-ray source 2 and underneath the table the film processing section is situated. The light-tight film processing section comprises several film storage magazines 3 from which one film sheet can each time be automatically removed and transported to the exposure position, indicated by the radiation beam 5, by means of a transport device (not shown). A film carriage 4, which is displaceable in the horizontal direction and which comprises intensifier foils, is provided at the exposure position. After the exposure, the film sheet is transported out of the beam path to a development device 6 by means of the transport device. However alternatively the film can be transported to a film takeup magazine. The X-ray examination apparatus described thusfar is essentially known (for example, see German Offenlegungsschrift No. 2616926, U.S. Pat. No. 3,891,850 or moving-grid radiographic table called "RAPIDO" from Picker).

According to the invention, underneath the plane of the film carriage there is provided a cassette loading and unloading station 7 in which a cassette to be loaded or unloaded can be introduced, in a plane perpendicular to the plane of drawing, via a cover which is not shown. The box-like cassette loading und unloading station 7 comprises an opening 9 at its side which faces the film storage magazine 3. The opening 9 can be closed in a light-tight manner by means of a slide (not shown). The film sheets can be loaded into an unloaded from the device 7 or the cassette 8 through the opening 9. Between the film storage magazines 3 on the one side and the cassette loading and unloading station 7 or the exposure position on the other side there is arranged a film guide device (not shown in FIG. 1), which serves to transport a film sheet either to the exposure position or from the exposure position back to the development device 6, or from the film storage magazine 3 to the cassette 8 or from the cassette 8 to the development device 6.

At least the part of the upper side of the cassette loading and unloading device 7 which is covered by the radiation beam 5 is made of a material which at least substantially absorbs the X-rays, so that a film introduced into the cassette is not exposed to X-rays in the cassette loading and unloading station.

Figure 2:
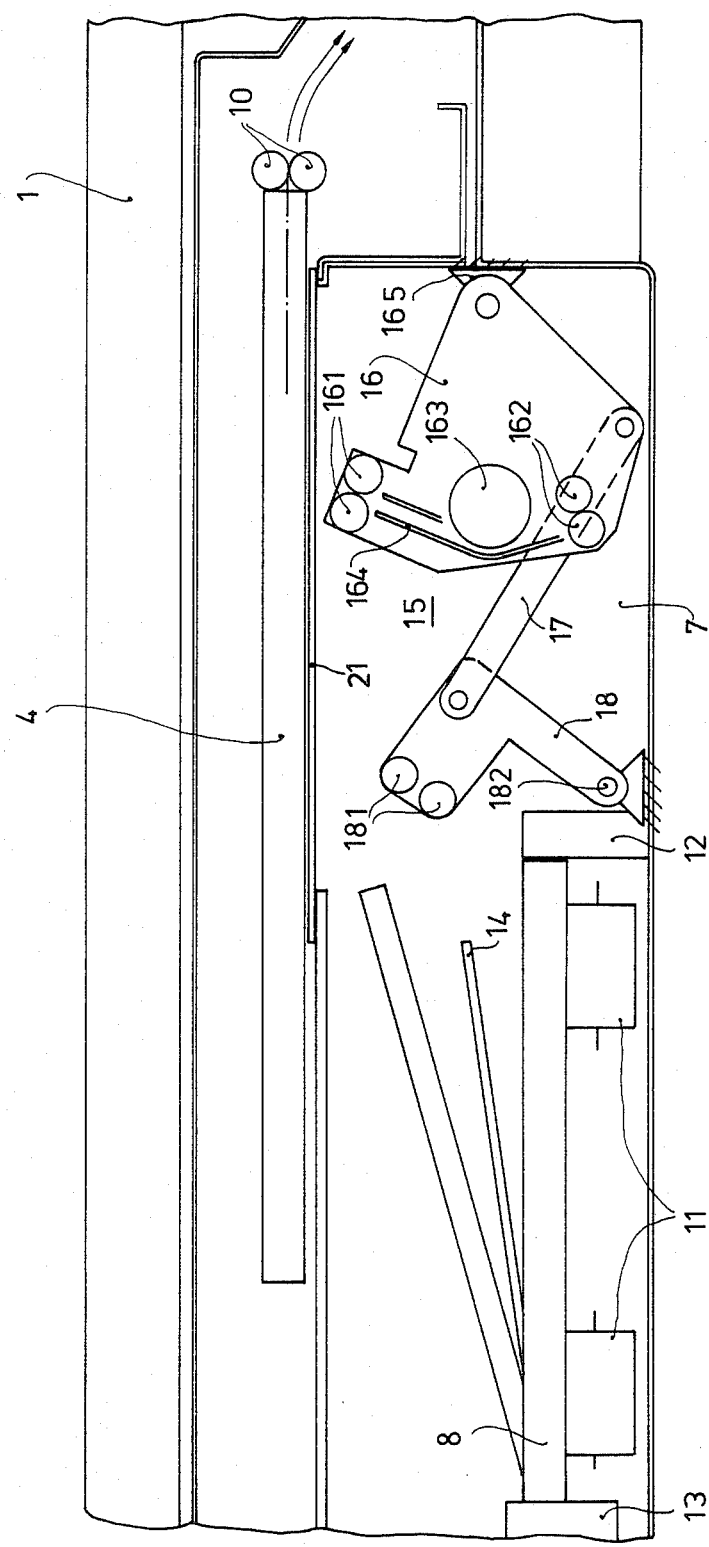
FIG. 2 schematically shows a cassette loading and unloading station and a film guide device according to the invention during a mode of operation for making Bucky exposures.
Figure 3:
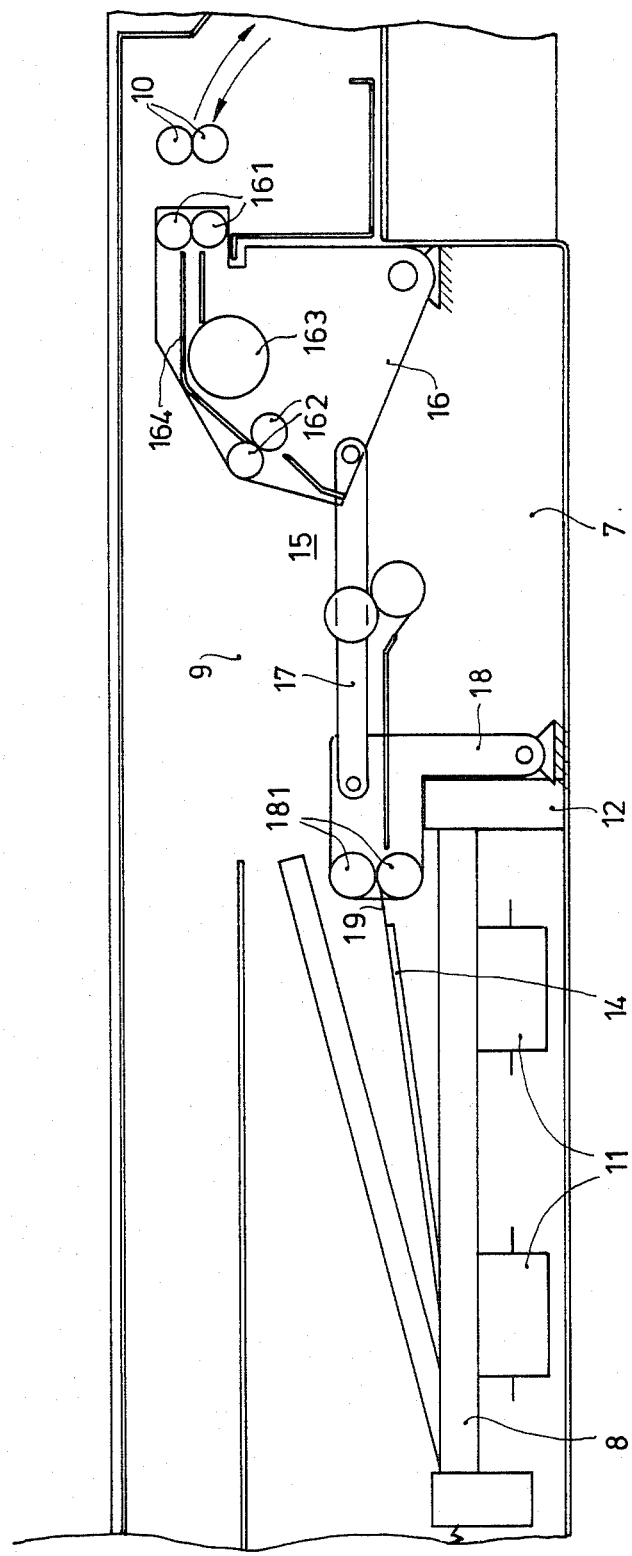
FIG. 3 schematically shows the station and guide of FIG. 2 during a mode of operation in which the cassette can be loaded and unloaded.

FIGS. 2 and 3 show a detail of the cassette loading and unloading station and the film guide device during two modes of operation. In one mode, the cassette can be loaded and unloaded. (FIG. 3.) In a second mode of operation, Bucky exposures can be made. (FIG. 2.) In FIG. 2, there are only shown the film carriage 4 and a stationary pair of transport rollers 10 (which can be driven in two directions) of the unloading and transport device which removes a film sheet from one of the film storage magazines 3 and which transports it to the exposure position or to the cassette loading and unloading station and back. The film sheet is first introduced into the film carriage 4 by means of, inter alia, the pair of transport rollers 10. The carriage is subsequently transported to the exposure position and back, after which the film sheet can be removed again. During this mode of operation, the opening at the top of the cassette loading and unloading station which is situated underneath the plane of the film carriage is closed in a light-tight manner by a slide 21. The cassette 8 can thus be inside the cassette loading and unloading station during the Bucky exposure mode, without the risk of light being incident (via the cover through which the cassette is introduced and via the opening 9 in the cassette loading and unloading station) on the film sheets to be exposed during the Bucky exposure mode.

The cassette loading and unloading station 7 comprises a pair of transport rollers 11 whose axes of rotation extend parallel to the plane of drawing and about which the transport belts (not shown) are guided for transporting the cassette 8 perpendicularly to the plane of drawing to a position which is defined by an abutment (not shown). A lateral stop 12 ensures that the opening side of the cassette 8 also occupies a defined position. A stop 13 which is pressed against the opposite side of the cassette 8 with a spring force ensures that this position is retained. The cassette 8 is constructed so that it can be automatically opened and closed in the cassette loading and unloading station. A suitable cassette in this respect is described in United Kingdom patent application No. 2,096,354 (corresponding to German Patent Application No. 3113793. The opening mechanism used therein ensures that after opening, the cassette lid and also the film hold-down plate 14 present in the cassette 8 are pivoted upward (although the hold-down plate 14 is pivoted over only approximately half the distance). A film present in the cassette then rests on the film hold-down plate 14 and can be readily removed. In this open condition a film can also be simply introduced.

The cassette loading and unloading station 7 also comprises a film guide device 15 which, however, may in principle also be arranged outside this station. The film guide device 15 consists of three sections 16, 17 and 18 which are pivotably interconnected. The first film guide section 16 comprises two pairs of transport rollers 161 and 162, at least one of which (161) can be driven.

This section 16 also comprises a guide roller 163 and guide rails 164. At the area 165, the section 16 is journalled to be pivotable about a stationary axis which extends perpendicularly to the plane of the drawing.

The second film guide section 18 also comprises a driven pair of rollers 181. At the area 182 it is journalled to be pivotable about a stationary axis which also extends perpendicularly to the plane of the drawing. The sections 16 and 18 are interconnected by means of an arm 17 which is pivotably connected to both sections. Film guide sections 16 and 18 are shown in their retracted positions in FIG. 2.

FIG. 3 shows the assembly during a mode of operation in which the slide 21 and the film carriage 4 have been moved aside (to the left), so that the opening 9 of the cassette loading and unloading station 7 is vacated. Moreover, the first film guide section 16 has been pivoted to a receiving/discharging position so that the pair of rollers 161 is situated adjacent and approximately at the same level as the stationary pair of rollers 10. Via the arm 17, the section 18 is pivoted to a loading/unloading position so that the pair of rollers 181 is situated near the front of the hold-down plate 14, so that a film 19 present thereon can be engaged. The described pivoting of the film guide device 15 can be performed, for example, by means of a pneumatically or hydraulically adjustable cylinder which acts on an abutment suitably positioned on one of the sections 16 to 18.

In the position shown in FIG. 3, the film 19 is removed from the cassette 8 by means of the drive rollers 181 and is transported, via the guide rollers and guide rails of the film guide device 15, to the pair of transport rollers 161, after which it is engaged by the rollers 10. After reversal of the drive direction of the transport rollers, the cassette is loaded. An unexposed film sheet is then transported into the cassette 8 along the same path but in the opposite direction.

Subsequently, the film guide device 15 can be returned to the position shown in FIG. 2, so that the opening 9 is again closed by the slide 21. After the automatic closing of the cassette 8 and actuation of the transport rollers in the opposite direction of rotation, the cassette can be removed again.

What is claimed is:

1. An X-ray examination apparatus having a light-tight film processing section comprising:
   at least one film storage magazine for storing film sheets; and
   means for unloading film sheets, one at a time, from the film storage magazine;
   a cassette loading and unloading station for accommodating a cassette; and
   a film guide device defining a first path between the film storage magazine and an exposure station and defining a second path between the film storage magazine and the cassette loading and unloading station, said film guide device being capable of switchably transporting film either to or from the exposure station along the first path or to or from the cassette loading and unloading station along the second path.

2. An apparatus as claimed in claim 1, characterized in that:
   the film sheets are transported essentially in a horizontal direction;
   the cassette loading and unloading station is situated underneath the exposure station; and the apparatus further comprises an X-ray absorbing shield between the cassette loading and unloading station and the exposure station.

3. An apparatus as claimed in claim 2, characterized in that the cassette loading and unloading station further comprises a slide which closes an opening in the cassette loading and unloading station in a light-tight manner.

4. A device for loading film into and for unloading film out of a film cassette, said device comprising:
- a fixed lateral stop, against which an openable end of a film cassette can be arranged to load and unload film;
- a first film guide section, pivotable between a film receiving/discharging position and a retracted position, the first film guide section being arranged to receive film from or discharge film to an external device when the first film guide section is in the film receiving/discharging position;
- a second film guide section, pivotable between a film loading/unloading position and a retracted position, the second film guide section being arranged to load film into and unload film out of the film cassette when the second film guide section is in the film loading/unloading position; and
- interconnection means for interconnecting the first and second film guide sections such that when the first film guide section is in the receiving/discharging position the second film guide section is in the loading/unloading position, and when the first film guide section is in the retracted position the second film guide section is in the retracted position;

characterized in that when the first film guide section is in the receiving/discharging position and the second film guide section is in the loading/unloading position, each film guide section is arranged to receive film from or discharge film to the other film guide section.

5. A device as claimed in claim 4, characterized in that the interconnection means comprises a rigid arm having two ends, said arm being pivotably connected at one end to the first film guide section and pivotably connected at the other end to the second film guide section.

6. A device as claimed in claim 5, characterized in that in operation the second film guide section is arranged at least partially inside the open end of a film cassette when the second film guide section is in the film loading/unloading position.

7. A device as claimed in claim 6, characterized in that:
- the device further comprises a housing; and
- the first film guide section is arranged at least partially outside of the housing when the first film guide section is in the receiving/discharging position.

8. A device as claimed in claim 7, characterized in that the first film guide section is arranged completely within the housing when the first film guide section is in the retracted position.

* * * * *